United States Patent [19]
Kitamura

[11] Patent Number: 5,949,931
[45] Date of Patent: Sep. 7, 1999

[54] OPTICAL COUPLER

[75] Inventor: Naoki Kitamura, Tokyo, Japan

[73] Assignee: NEC Corporation, Tokyo, Japan

[21] Appl. No.: 08/905,820

[22] Filed: Aug. 4, 1997

[30] Foreign Application Priority Data

Aug. 2, 1996 [JP] Japan ..................................... 8-204667

[51] Int. Cl.⁶ ..................................................... G02B 6/26
[52] U.S. Cl. ................................ 385/28; 385/14; 385/31; 385/43; 385/48; 385/50; 385/129
[58] Field of Search ................................. 385/28, 29, 31, 385/43, 48, 49, 50, 51, 129, 132, 14

[56] References Cited

U.S. PATENT DOCUMENTS

| | | | |
|---|---|---|---|
| 4,995,686 | 2/1991 | Blonder et al. | 385/50 |
| 5,091,986 | 2/1992 | Arii et al. | 385/49 |
| 5,410,625 | 4/1995 | Jenkins et al. | 385/28 |
| 5,475,776 | 12/1995 | Jenkins et al. | 385/28 |
| 5,586,209 | 12/1996 | Matsuura et al. | 385/14 |
| 5,712,937 | 1/1998 | Asawa et al. | 385/28 |

FOREIGN PATENT DOCUMENTS 4-178603  6/1992  Japan.
7-303266  11/1995  Japan.

OTHER PUBLICATIONS

Ryo Nagase et al., "Silica Based 8×8 Optical Matrix Switch Module with Hybrid Integrated Driving Circuits and its System Application", pp. 1631–1639, Journal of Lightwave Technology, vol. 12, No. 9, Sep. 1994.

Primary Examiner—Hemang Sanghavi
Attorney, Agent, or Firm—Young & Thompson

[57] ABSTRACT

An optical coupler having a substrate; an optical waveguide provided on the substrate; a multimode fiber optically coupled with the optical waveguide; and a single mode fiber optically coupled with the optical waveguide, the optical waveguide provided on the substrate having a multimode waveguide and a plurality of single mode waveguides, the multimode waveguide being optically coupled with the multimode fiber, the single mode waveguide being optically coupled with the single mode fiber. The above constitution can suppress the creation of branch loss.

9 Claims, 7 Drawing Sheets

OPTICAL COUPLER

FIELD OF THE INVENTION

The present invention relates to an optical coupler for optical interconnection and other applications and more particularly to an optical coupler for an optical switch comprising a combination of a semiconductor optical amplifier with a splitter, a combiner and the like.

BACKGROUND OF THE INVENTION

At the present time, electric wiring is generally used as a data transfer path for connecting CPU, a memory, input and output devices and the like to one another in a computer. An increase in operation speed of the computer in recent years, however, has heightened the importance of increasing the data transfer capacity. Further, regarding recent computers, extensive and intensive studies have been made wherein a plurality of processors are mounted in a computer and connected to each other or one another in a parallel form to constitute a network. In this case, increasing the capacity of the transfer path is a large task to be accomplished. Further, also in a communication apparatus, increased required throughput of an exchange has lead to a demand for increased capacity of transfer between boards in a communication apparatus or between communication apparatuses. The number of electric wirings has hitherto been increased to cope with the increase in the number of apparatuses connected and the increase in capacity. Increasing the number of electric wirings, however, has reached the limit.

In order to cope with the increase in data capacity, studies on an optical network technique using light instead of electricity have been energetically made. Among others, an optical switch which is one construction for realizing a data transfer path using light is particularly important.

In general, optical switches, such as an optical switch comprising a waveguide provided on an $LiNbO_3$ substrate to utilize the electrooptic effect of $LiNbO_3$ and an optical switch utilizing the thermooptic effect of a quartz waveguide, have been developed from the viewpoint of superior expandability of the scale.

In the $LiNbO_3$ optical switch, however, a several tens of volts is necessary as the switching voltage, imposing a burden on a driver for driving the optical switch. Further, as described in R. Nagase et al., Journal of Lightwave Technology, Vol. 12 No. 9, 1994, pp. 1631–1639, the quartz waveguide type optical switch requires a power of one W per device, posing a problem of large power consumption.

An optical switch using a gate function of a semiconductor light amplifier has been proposed as an optical switch alternative to the above optical switches. In this optical switch, a signal output from each optical transmitter to an optical fiber is branched in a splitter and enters a semiconductor optical amplifier. The semiconductor optical amplifier functions as a gate for performing ON/OFF of light. Therefore, selection of any path for output followed by driving of only a semiconductor optical amplifier in this path permits an amplified signal to be transmitted through a combiner to an optical receiver in a desired path.

In the conventional optical switch, however, a splitter and a combiner are indispensable. A fiber fusing type coupler is used in the splitter and the combiner. It is known that loss unfavorably increases with increasing the number of branches. This is because the branch loss is essentially present in the branch section of the coupler.

For example, when an 8-input, 8-output optical switch is constructed, a signal power loss of 1 dB and a signal power loss of 8 dB (9 dB in total) are created respectively in the splitter section and the combiner section. That is, a total power loss as large as 18 dB (power loss in inlet+power loss in outlet) is created. Therefore, despite -he amplification in the semiconductor optical amplifiers the signal admitted into the receiver is very weak.

In particular, an increase in capacity of computers and communication networks in recent years has rendered an increase in scale and speed of the optical switch indispensable, necessitating increasing the light receiving level required for increasing the speed of the receiver. In the construction including a splitter and a combiner using a fiber fusing type coupler, it is very difficult to achieve the increase in transfer speed and scale. In fact, the processable signal is as low as several Gbit/s on 2×2, 4×4 level.

In order to reduce the above branch loss, Japanese Patent Laid-Open No. 291604/1987 discloses slant connection of one single mode waveguide to the side face of one multimode. In this construction, the branch loss is reduced by providing a tapered one single mode waveguide on the side face of one multimode waveguide, and it is difficult to connect a number of single mode waveguides to the multimode waveguide.

SUMMARY OF THE INVENTION

Accordingly, an object of the present invention is to provide an optical coupler which can improve the receiving sensitivity (that is, can increase the transfer speed) of an optical switch comprising a semiconductor amplifier, a splitter, and a combiner and, at the same time, can increase the scale of the optical switch.

According to the first feature of the invention, an optical coupler, comprises: a substrate, and a plurality of single mode waveguides and a multimode waveguide provided on the substrate, the plurality of single mode waveguides being disposed parallel to the multimode waveguide, the end face of the plurality of single mode waveguides being optically coupled with the end face of the multimode waveguide.

According to the second feature of the invention, an optical coupler, comprises: a substrate, and a plurality of single mode waveguides and one multimode waveguide provided on the substrate, the shape of the multirode waveguide and the layout of the single mode waveguide being set so that beam diameters of signal lights from the plurality of single mode waveguides are put on top of one another at the outgoing end of the multimode waveguide.

According to a preferred embodiment of the present invention, the diameter of the signal light admitted from the single mode waveguide into the multimode waveguide, at the outgoing end face of the multimode optical guide is equal to or smaller than a multimode fiber.

According to another preferred embodiment of the present invention, the width of the single mode optical waveguides is increased in a taper form in the vicinity of a section where the single mode optical waveguides are coupled with the multimode optical waveguide.

According to still another preferred embodiment of the present invention, the optical coupler further comprises a plurality of single mode fibers optically coupled with the plurality of single mode waveguides and a multimode fiber optically coupled with the multimode waveguide.

According to a further preferred embodiment of the present invention, the angle between the plurality of single mode optical waveguides and the multimode fiber is smaller than the maximum light receiving angle of the multimode fiber.

According to a still further preferred embodiment of the present invention, the optical waveguide comprises a quartz optical waveguide or a semiconductor optical waveguide.

According to another preferred embodiment of the present invention, the substrate is a silicon substrate and provided with a fiber guide for mounting the multimode fiber or the single mode fiber formed by anisotropic etching of silicon.

According to the optical coupler of the present invention, a plurality of single mode waveguides and a multimode waveguide are provided on a substrate, and the plurality of single mode waveguides are optically coupled with the multimode waveguide. Further, a plurality of single mode fibers are coupled with the plurality of single mode waveguides provided on the substrate, and the multimode waveguide provided on the substrates is coupled with a multimode fiber.

According to the present invention, since the plurality of single mode waveguides and the multimode waveguide provided on the substrate are coupled with each otter, the branch loss, which has been inherently unavoidable in the conventional fiber fusing type coupler or the like, is not created. This can eliminate the loss in the combiner section, resulting in reduced loss of the whole optical switch. That is, it is possible to improve the receiving sensitivity (that is, to increase the transfer speed) of the optical switch and, in addition, to increase the scale of the optical switch.

BRIEF DESCRIPTION OF THE DRAWINGS

The invention will be explained in more detail in conjunction with appended drawings, wherein.

DESCRIPTION OF THE PREFERRED EMBODIMENTS

Before explaining an optical coupler in the preferred embodiment according to the invention, the aforementioned conventional optical switch will be explained in FIG. 1.

Figure 1:
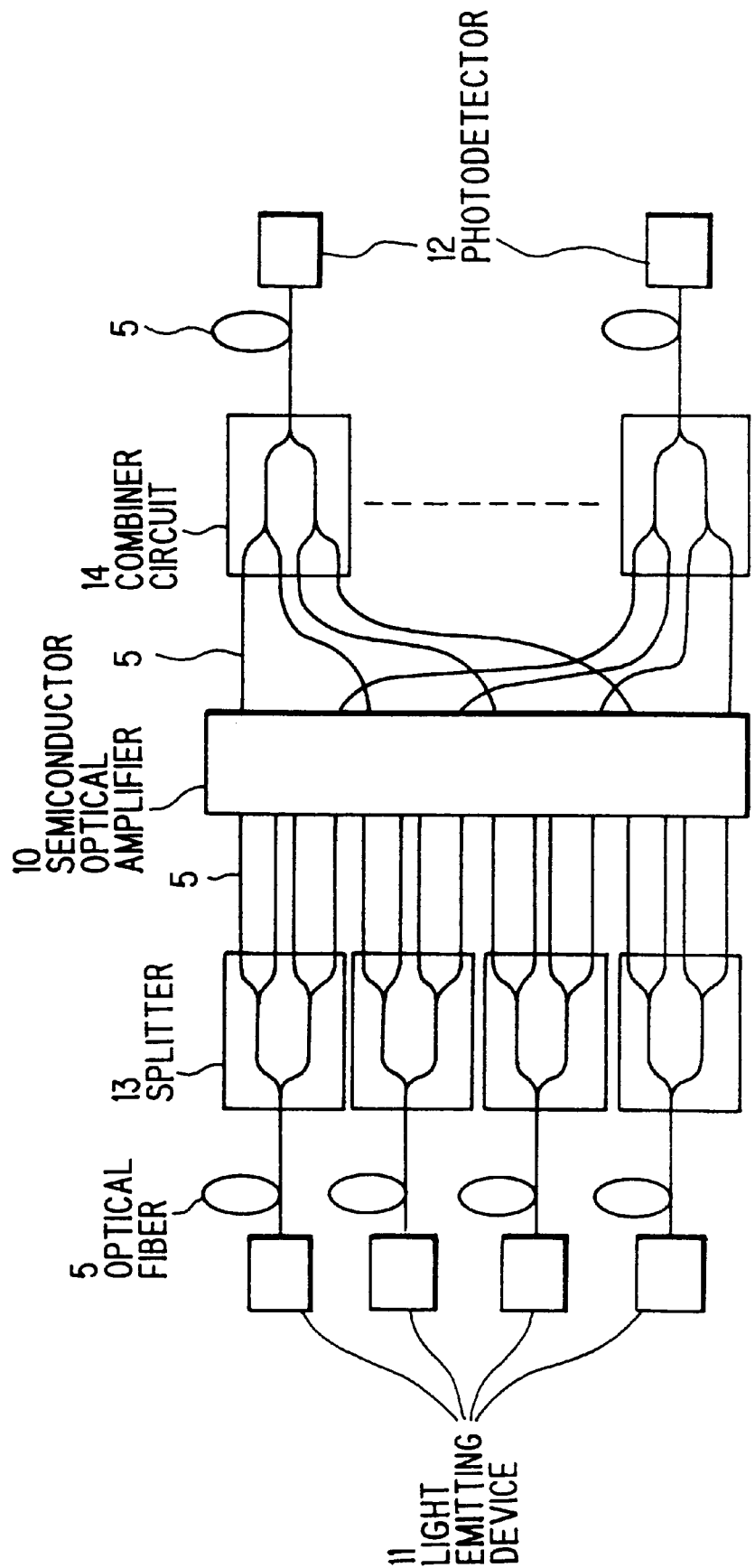
FIG. 1 is a plan view of a conventional optical switch.

As shown in FIG. 1, in the conventional optical switch, signals, which have been output from each transmitter 11 and input into a single mode optical fiber 5, are branched in a splitter 13 and enter a semiconductor optical amplifier 10. The signals amplified in the semiconductor optical amplifier 10 are passed through a single mode optical fiber 5, multiplexed in a combiner 14, passed through a single mode fiber 5, and fed into a photodetector 12.

As described above, however, the conventional optical switch has the following drawbacks. Specifically, a splitter 13 and a combiner 14 are indispensable for the construction of this type of optical switch. In general, a fiber fusing type coupler is used for the splitter and the combiner. It is known that loss unfavorably increases with increasing the number of branches. This is because the branch loss is essentially present in the branch section of the coupler.

For example, when an 8-input, 8-output optical switch is constructed, a signal power loss of 1 dB and a signal power loss of 8 dB (9 dB in total) are created respectively in the splitter section and the combiner section. That is, a total power loss as large as 18 dB (power loss in inlet+power loss in outlet) is created. Therefore, despite the amplification in the semiconductor optical amplifier, the signal admitted into the receiver is very weak.

In particular, an increase in capacity of computers and communication networks in recent years has rendered an increase in scale and speed of the optical switch indispensable, necessitating increasing the light receiving level required for increasing the speed of the receiver. In the construction including a splitter and a combiner using a fiber fusing type coupler, it is very difficult to achieve the increase in transfer speed and scale. In fact, the processable signal is as low as several Gbit/s on 2×2, 4×4 level.

Next, an optical coupler in the first preferred embodiment according to the invention will be explained with reference to FIG. 2.

Figure 2:
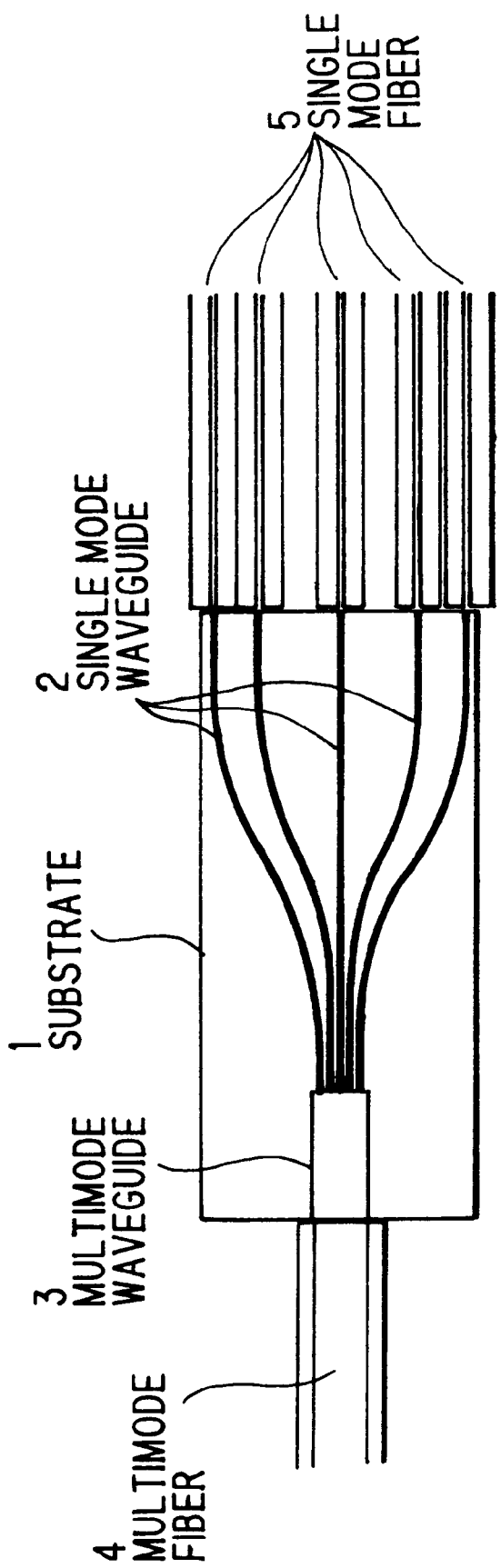
FIG. 2 is a plan view of the first embodiment of the present invention.

As shown in FIG. 2, numeral 4 designates a multimode fiber, numeral 5 a single mode fiber, numeral 1 a substrate, and numerals 3 and 2 respectively a multimode waveguide and a single mode waveguide provided on the substrate 1. Signal light, which has been passed through the single mode fiber 5, is propagated through the single mode waveguide 2 and coupled with the multimode waveguide 3. The signal light from the multimode waveguide 3 is propagated through the multimode fiber 4 and detected by a photodetector.

Next, a coupling section between the single mode waveguide 2 and the multimode waveguide 3 in the first embodiment of the present invention will be described. In the first embodiment, the single mode waveguide and the multimode waveguide are disposed parallel to each other, and the end face of the single mode waveguide is coupled with the end face of the multimode waveguide. In this embodiment, these, end faces are optically coupled with each other, reducing radiation loss.

In general, the core diameter of the multimode fiber 4 is 50 to 80 $\mu$m, and, in the first embodiment, the width of the multimode waveguide is preferably equal to or smaller than the core diameter from the viewpoint of reducing the loss derived from coupling with the fiber. This requirement limits the number of branches of the single mode waveguide input into the multimode waveguide.

Specifically, an example where the diameter of the multimode fiber and the diameter of the multimode waveguide are respectively 80 $\mu$m and 60 $\mu$m will be examined. In the case of a semiconductor optical waveguide, a waveguide width of 1 to 2 $\mu$m is generally suitable. Therefore, the number of branches may be increased to about 30 to 60. On the other hand, in the case of a quartz waveguide, the commonly used core width is 4 to 8 $\mu$m from the viewpoint of minimizing the loss derived from coupling with the single mode fiber. In this case, the number of branches is about 8 to 15 and, hence, is limited as compared with that in the case of the semiconductor optical waveguide.

Figure 3:
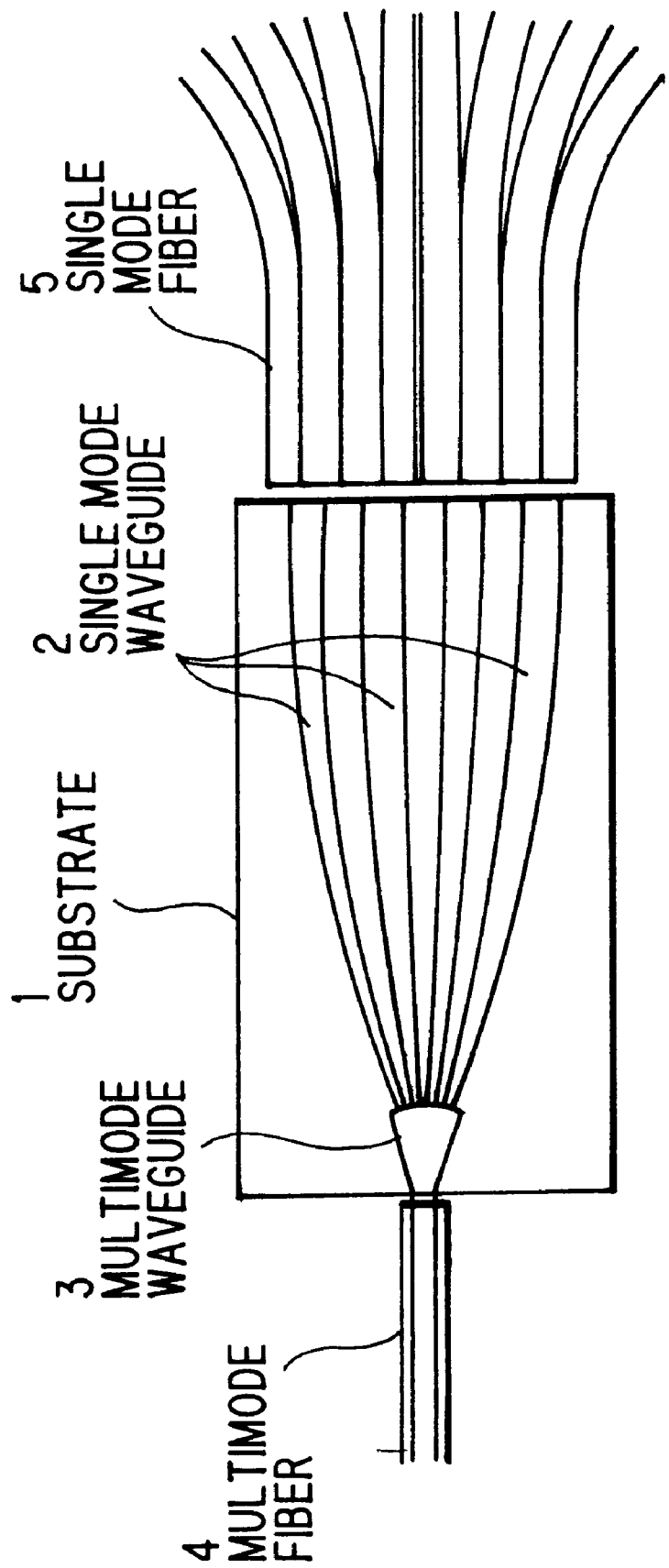
FIG. 3 is a structural diagram showing the second embodiment of the present invention.

An optical coupler according to the second embodiment of the present invention is shown in FIG. 3. In FIG. 3, numeral 4 designates a multimode fiber, numeral 5 a single mode fiber, numeral 1 a substrate, and numerals 3 and 2 respectively a multimode waveguide and a single mode waveguide provided on the substrate 1. Signal light, which has been output from the single mode fiber 5 and input into the single mode waveguide 2, is propagated through the single mode waveguide 2 and coupled with the multimode waveguide 3. The signal light from the multimode waveguide 3 is propagated through the multimode fiber 4 and detected by a photodetector.

Figure 4A:
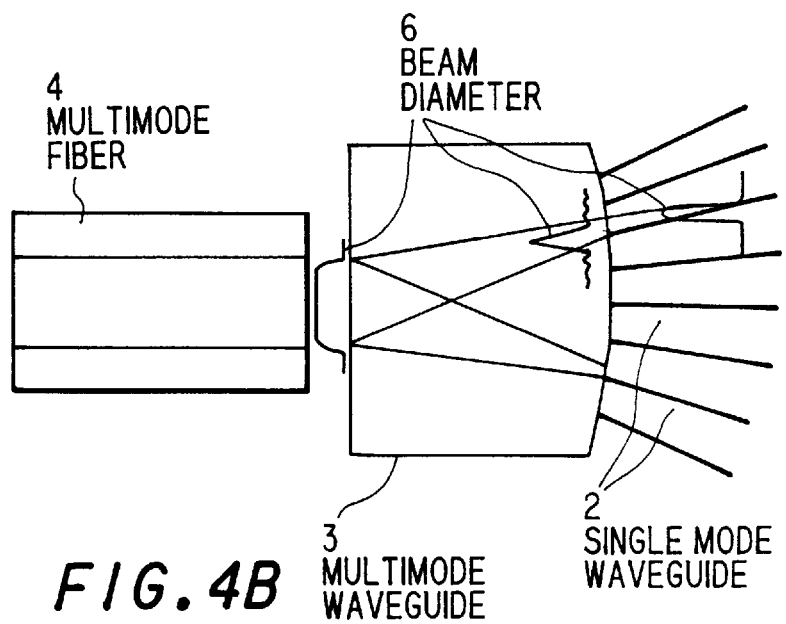
FIGS. 4A–4B are plan views showing a coupling section according to the second embodiment of the present invention.
Figure 4B:
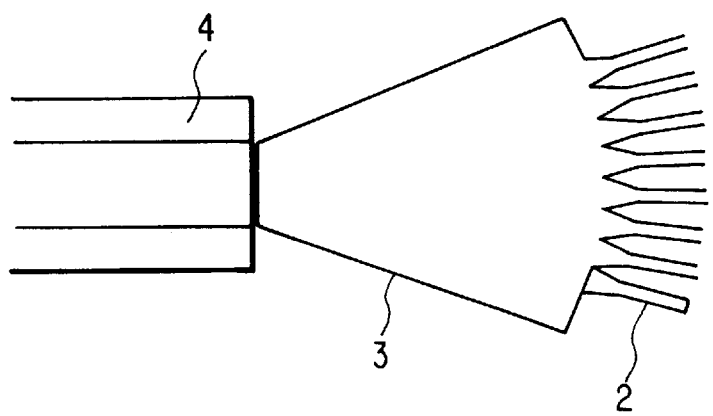

Next, a coupling section between the multimode waveguide 3 and the single mode waveguide 2 in the second embodiment of the present invention will be described. FIGS. 4A and 4B each show a coupling section between the multimode waveguide 3 and the single mode waveguide 2 in the second embodiment of the present invention.

In FIG. 4A, signal light from the end face of the single mode waveguide 2 enters the end face of the multimode waveguide 3 free from confinement in the lateral direction and is propagated through the multimode region while gradually increasing the beam diameter 6. In this case, the length of the multimode propagation region in the multimode waveguide 3 is set so that the beam diameter of the waveguide light, which has entered the multimode waveguide 3, is equal to or smaller than the diameter of the multimode fiber 4 coupled with the multimode waveguide 3. Further, the optical coupler is designed so that lights from ports of all single mode waveguides 2 are coupled with the multimode fiber 4 in the same position of the end face of the multimode waveguide.

According to this embodiment, when the shapes of the multimode waveguide 3 and the layout of the single mode waveguide 2 are properly set, the number of branches in the second embodiment can be made larger than that in the first embodiment. In this case, the number of branches in the second embodiment can be made larger than that in the first embodiment by setting the length of the multimode propagation region so that the beam diameter of the waveguide light, which has entered the multimode waveguide 3, is equal to or smaller than the core diameter of the multimode fiber 4 coupled with the multimode waveguide 3, and, at the same time, by designing the optical coupler so that lights from all ports are coupled with the multimode fiber 4 in the same position. In this connection, the coupling efficiency can be enhanced by designing the optical coupler so that the angle between each of the single mode waveguides and the multimode fiber is smaller than the maximum light receiving angle of the multimode fiber.

In FIG. 4B, when the single mode waveguide width is gradually enlarged in a taper form in the vicinity of a section where the single mode waveguide is coupled with the multimode waveguide, the spot size of the light, which is propagated through the single mode waveguide, is increased, reducing the spread of the light upon entrance into the multimode waveguide. This enables the number of input ports to be increased with low coupling loss, which is very useful for the construction of the optical coupler according to the present invention.

Figure 5:
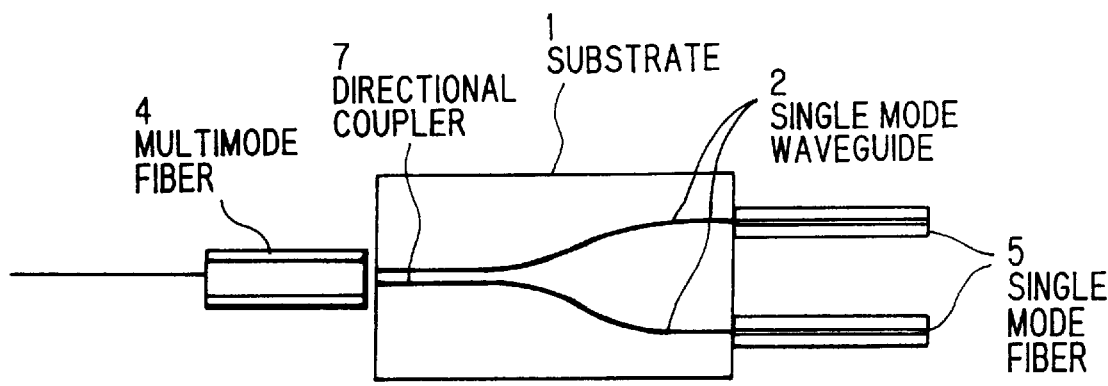
FIG. 5 is a plan view of the third embodiment of the present invention.

An optical coupler according to the third embodiment of the present invention is shown in FIG. 5. The above embodiments aims to increase the number of branches. On the other hand, according to the third embodiment, the present invention is applied to the case where the number of branches is small. In FIG. 5, numeral 4 designates a multimode fiber, and numeral 5 a single mode fiber. Two single mode waveguide 2 are provided on a substrate 1. A part of one single mode waveguide is disposed adjacent to a part of the other single mode waveguide, and, in this position, a directional coupler 7 is provided. The directional coupler also is a kind of a multimode waveguide through which two modes are propagated. Therefore, the basic principle of the third embodiment the same as that of the first and second embodiments, and coupling of the output side, i.e., the directional coupler 7, with the multimode fiber 4 can realize an optical coupler with two branches.

Figure 6:
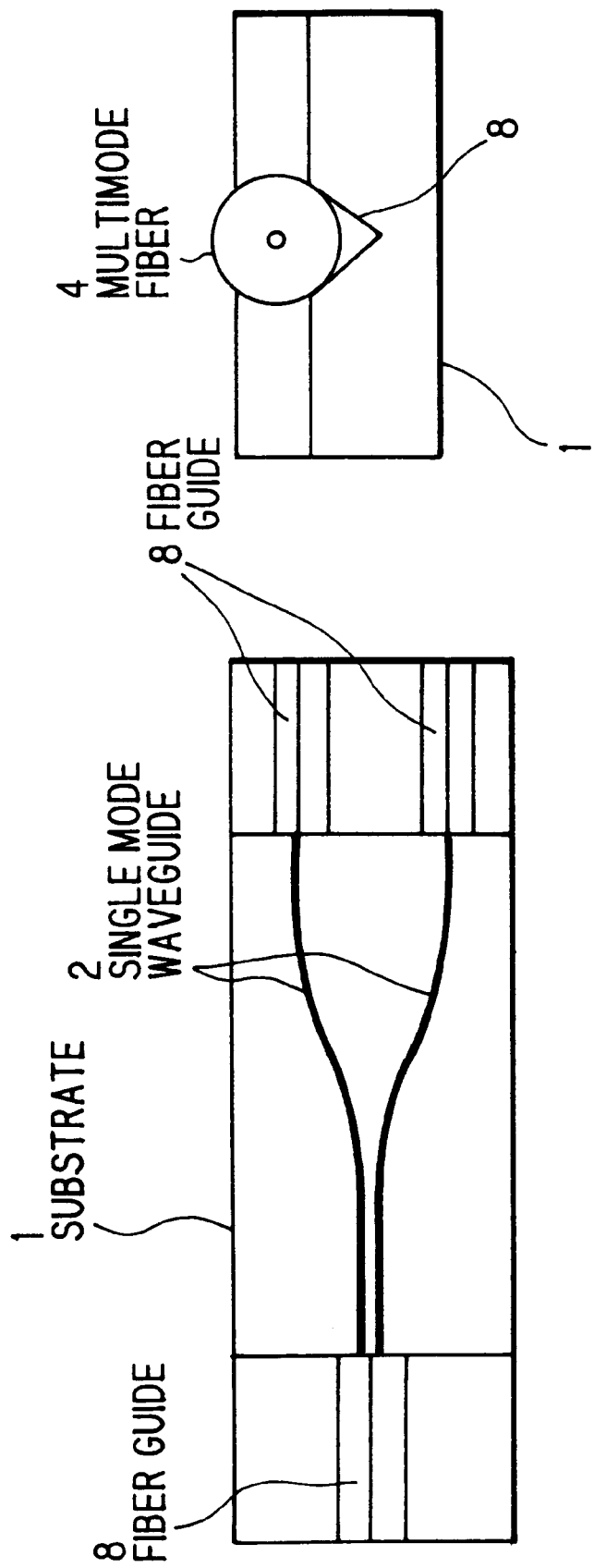
FIG. 6 is a cross-sectional view of the fourth embodiment of the present invention.

FIGS. 6(A) and 6(B) show an optical coupler according to the fourth embodiment of the present invention. In this optical coupler, a technique requiring no regulation is applied to the optical coupler according to the third embodiment. In FIG. 6A, numeral 1 designates a substrate, numeral 2 a single mode waveguide, and numeral 8 a fiber guide. In FIG. 6B, a multimode fiber 4 is mounted on the fiber guide 8.

In the case of a quartz waveguide, the substrate used is generally made of silicon. It is known that a silicon crystal can be anisotropically etched with potassium hydroxide or the like. The anisotropic etching is used to form a V-shaped groove or the like, and this silicon is used as a fiber guide. According to the anisotropic etching, the groove can be formed with a very high accuracy, enabling the fiber and the waveguide to be very efficiently coupled with each other without any regulation. In the present invention, a multimode fiber end a number of single mode fibers should be coupled with the waveguide. Therefore, the technique requiring no regulation is very useful for the preparation of devices.

As described above, according to the present invention, an improvement in receiving sensitivity and an increase in scale of a splitter/combiner type optical switch using a semiconductor optical amplifier can be easily achieved.

Means for forming the optical coupler of the present invention includes, for example, various methods utilizing an InGaAsP-based semiconductor waveguide, a quartz waveguide prepared by doping a quartz film with phosphorus, boron, germanium, titanium or the like, a waveguide prepared by heat-diffusing titanium in an $LiNbO_3$ substrate, and a waveguide using an organic compound, such as PMMA.

Among the first to fourth embodiments, an optical coupler having a structure, according to the second embodiment, with 8 branches was actually prepared using a quartz waveguide and evaluated. In the case of 8 branches, use of the conventional fiber coupler and the like results in a branch loss of 9 dB. By contrast, in the construction according to the present invention, a loss of not more than 1 dB in terms of the insertion loss of the whole device could be achieved. The propagation loss of the waveguide per se and the loss associated with coupling of the waveguide with the fiber are included in this value, suggesting that substantially no branch loss is created.

In addition to the application of the present invention to the optical switch, integration with other devices can offer a wider range of applications.

Figure 7:
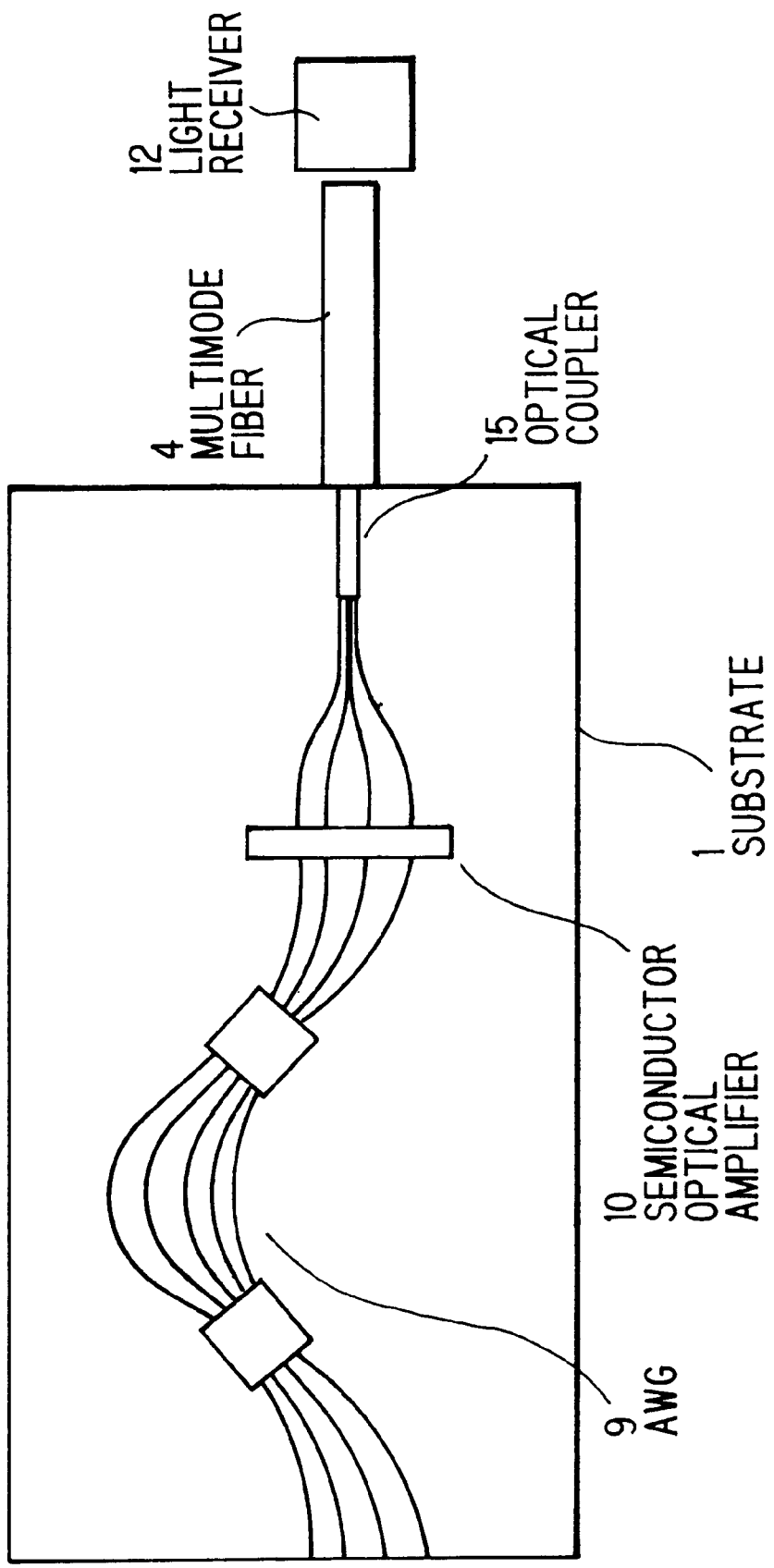
FIG. 7 is a typical diagram off another embodiment of the present invention.

FIG. 7 is a typical diagram showing an application example of the present invention. In recent years, a wavelength filter called "AWG" utilizing waveguide grating has been energetically studied. The construction shown in FIG. 7 comprises a combination of AWG 9 with the optical coupler 15 of the present invention. Both AWG 9 and the optical coupler are constituted by a waveguide and, hence, can be integrated on the same substrate 1. Signal light having a plurality of wavelengths, which has entered AWG 9, is output from the output side of AWG and input into a different waveguide for each wavelength. When this waveguide is used as the input section of the optical coupler 15 of the present invention and, at the same time, a semiconductor optical amplifier 10 is inserted between AWG 9 and the optical coupler 15, utilization of the gate function of the semiconductor optical amplifier enables only a signal having a desired wavelength to be coupled with a multimode fiber 4 of the output side with low loss and to be detected by a photodetector 12. That is this construction can offer the function of selecting the wavelength.

As described above, according to the present invention, a plurality of single mode optical waveguides are condensed in a multimode waveguide, creating no principle-derived loss in this portion. Therefore, even when the scale of the circuit is increased, the insertion loss of the whole circuit is not increased because no branch loss occurs creating no lowering in receiving sensitivity in the receiver.

Figure 8:
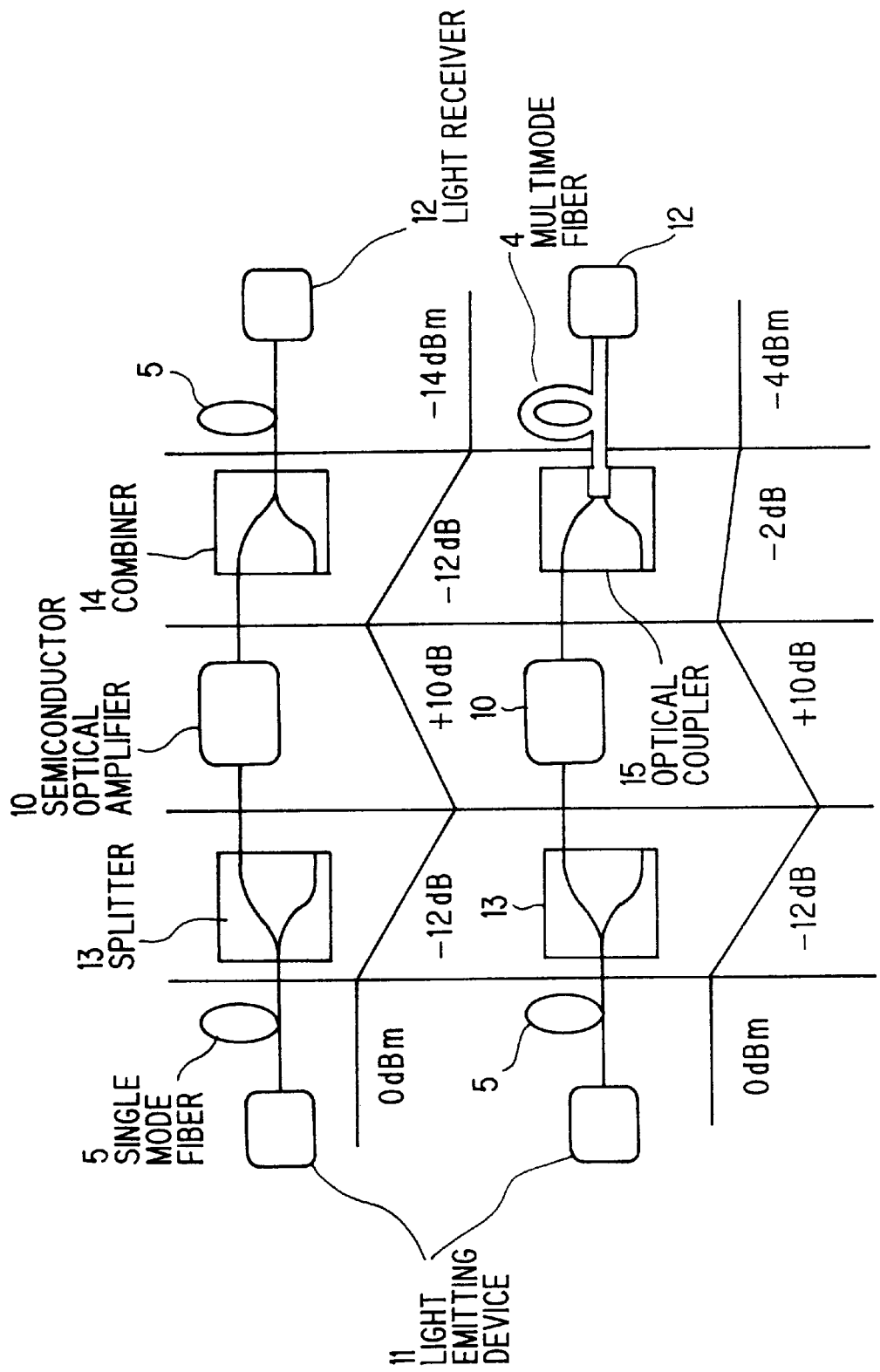
FIG. 8 is a diagram showing comparison of the signal level in the present invention with the signal level in the prior art.

FIG. 8 is a diagram showing comparison of the effect, attained by applying the optical coupler of the present invention to an optical switch with 16 branches, with the effect attained by the conventional optical switch. In the drawing, the conventional optical switch with 16 branches is shown in the upper part, and an optical switch, with 16 branches, to which the present invention has been applied is shown in tire lower part. The intensity level of the signal is shown in each of the constructions. In the drawing, numeral 11 designates a light emitting element, numeral 5 a single mode fiber, numeral 13 a splitter, numeral 10 a semiconductor optical amplifier, numeral 14 a combiner, and numeral 12 a photodetector.

When the conventional coupler with 16 branches is used, a loss of 12 dB is created in the splitter section 13 and the combiner section 14. In the case, ever when the signal is amplified by 10 dB using the semiconductor optical amplifier 10, the receiving level on the receiver side is −14 dBm, A receiving level of about −8 dBm is necessary for actually receiving a high speed signal of 10 Gbit/se class. The conventional construction cannot offer this receiving level.

By contrast, when the optical coupler 15 of the present invention is applied to the combiner section, no branch loss is created in this section. Therefore, a receiving level of −4 dBm can be achieved on the receiver side even when the insertion loss of the optical coupler of the present invention is estimated to be −2 dB. This offers satisfactory receiving sensitivity and a further increase in scale.

The invention has been described in detail with particular reference to preferred embodiments, but it will be understood that variations and modifications can be effected within the scope of the invention as set forth in the appended claims.

What is claimed is:

1. An optical coupler comprising:

a substrate;

a plurality of single mode waveguides and a multimode waveguide on said substrate, each of said single mode waveguides being optically coupled to said multimode waveguide at a convex first surface of said multimode waveguide; and a multimode fiber optically coupled to said multimode waveguide at a second surface of said multimode waveguide opposite said convex first surface, said multimode fiber having a maximum light receiving angle, wherein angles between an axis of said multimode fiber at said second surface and respective axes of each of said single mode waveguides at said first surface are each smaller than the maximum light receiving angle of said multimode fiber.

2. The coupler of claim 1, wherein said convex first surface is an arc having its focus within said multimode fiber.

3. The coupler of claim 2, wherein at said first surface the axes of all of said single mode waveguides are directed to a single point on said second surface.

4. The coupler of claim 3, wherein said multimode waveguide has a length between said first and second surfaces so that diameters of beams of lights received from said single mode waveguides at said first surface are no greater than a diameter of said multimode fiber when the beams reach said second surface.

5. The coupler of claim 4, wherein said second surface of said multimode waveguide has a first width that approximates a diameter of said multimode fiber, wherein said convex first surface has a chord-wise width greater than the first width, and wherein a width of said multimode waveguide tapers from said chord-wise width to said first width.

6. The coupler of claim 1, wherein said multimode waveguide has a length between said first and second surfaces so that diameters of beams of lights received from said single mode waveguides at said first surface are no greater than a diameter of said multimode fiber when the beams reach said second surface.

7. The coupler of claim 1, wherein said multimode waveguide is arranged and constructed so that beams of light received from said single mode waveguides at said convex first surface are not confined in a direction perpendicular to a chord-wise direction of said convex first surface as the beams move to said second surface.

8. The coupler of claim 1, wherein at said first surface the axes of all of said single mode waveguides are directed to a single point on said second surface.

9. The coupler of claim 1, wherein said second surface of said multimode waveguide has a first width that approximates a diameter of said multimode fiber, wherein said convex first surface has a chord-wise width greater than the first width, and wherein a width of said multimode waveguide tapers from said chord-wise width to said first width.

* * * * *